No. 867,512. PATENTED OCT. 1, 1907.
L. S. KEETER.
SAW FILING MACHINE.
APPLICATION FILED APR. 11, 1906.
2 SHEETS—SHEET 2.
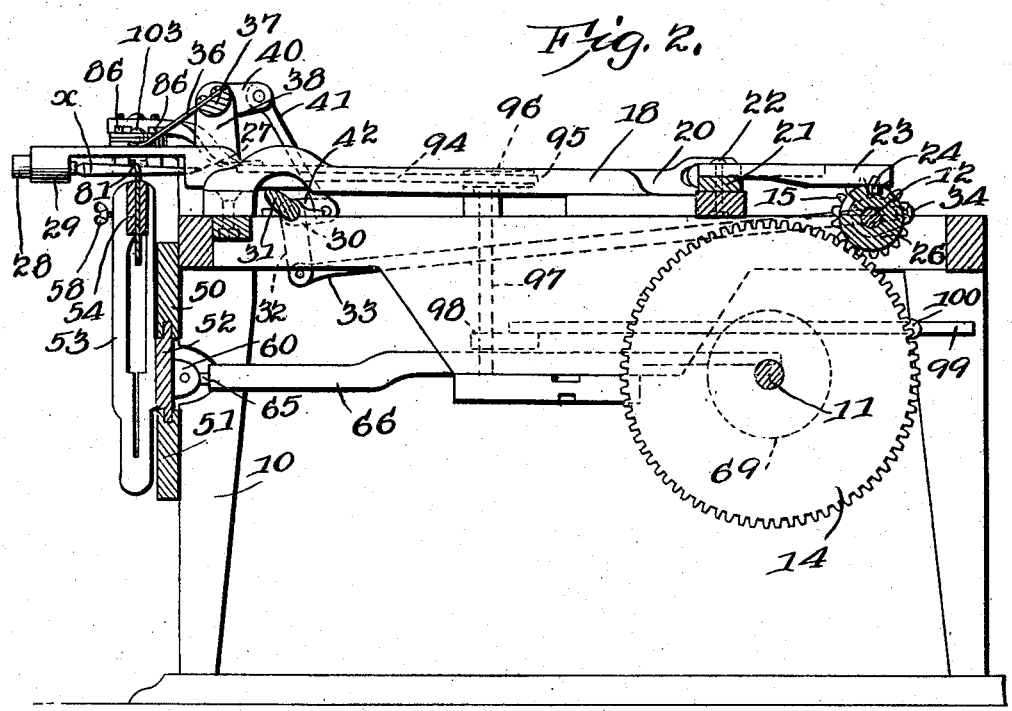
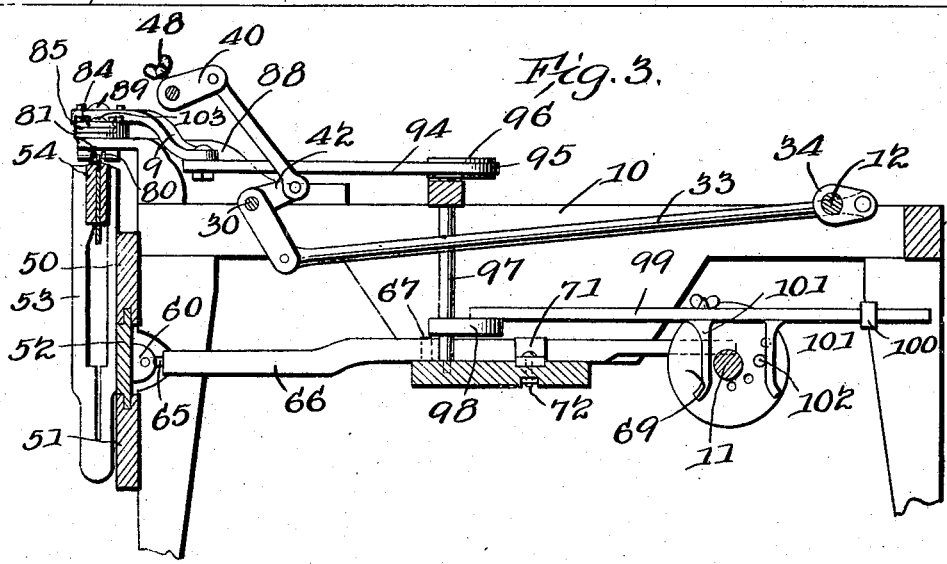
WITNESSES:
Logan S. Keeter, INVENTOR.
By C. A. Snow & Co.
ATTORNEYS

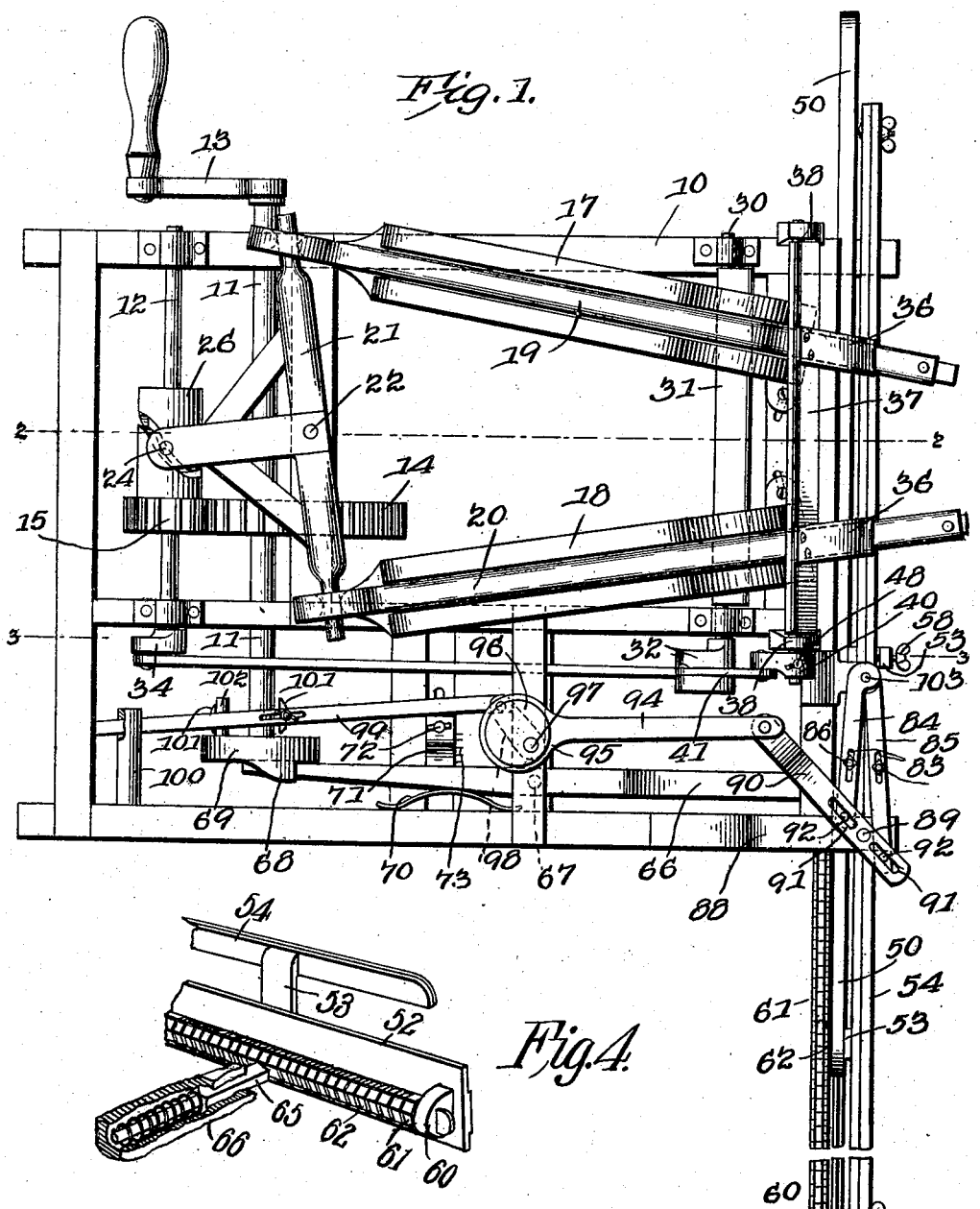

UNITED STATES PATENT OFFICE.

LOGAN S. KEETER, OF SALISBURY, NORTH CAROLINA.

SAW-FILING MACHINE.

No. 867,512.      Specification of Letters Patent.      Patented Oct. 1, 1907.

Application filed April 11, 1906. Serial No. 311,153.

*To all whom it may concern:*

Be it known that I, LOGAN S. KEETER, a citizen of the United States, residing at Salisbury, in the county of Rowan and State of North Carolina, have invented a new and useful Saw-Filing Machine, of which the following is a specification.

This invention relates to saw filing and setting machines, and has for one of its objects to provide a machine in which the saw is operated upon in opposite directions simultaneously in order to equalize strains, two files being used which simultaneously engage separate teeth, and while one is on the out stroke, the other is on the in stroke.

A further object of the invention is to construct a machine of this type in which the file carriers may be arranged to reciprocate a number of times, and then move upward to disengage the files from the teeth of the saw prior to a saw feeding movement.

A still further object of the invention is to provide a mechanism of simple construction for quickly adjusting the pressure on the file in accordance with the condition of the file and saw.

A still further object of the invention is to provide a novel form of saw feeding mechanism which may be adjusted for the purpose of feeding saws having teeth of any pitch.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a plan view of a saw filing and setting machine constructed in accordance with the invention. Fig. 2 is a vertical section of the same on the line 2—2 of Fig. 1. Fig. 3 is a similar view on the line 3—3 of Fig. 1. Fig. 4 is a detail perspective view of the saw feeding mechanism, detached.

Similar numerals of reference are employed to indicate corresponding parts throughout the several figures of the drawings.

The working parts of the machine are supported on a suitable frame 10 that is provided with bearings for the support of a pair of shafts 11 and 12, disposed in parallel relation, the shaft 11 being connected to any suitable operating mechanism, this in the present instance being shown in the form of a crank 13.

The shaft 11 carries a gear wheel 14 that intermeshes with a pinion 15 on the shaft 12, the relative diameters of the gear and pinion being such that there will be four file strokes in the sharpening of each tooth, but the gears may be made larger or smaller for the purpose of increasing or decreasing the number of sharpening strokes.

The frame carries two guides 17 and 18 arranged at an acute angle with reference to each other, and each of them being at an angle with respect to the transverse plane of the saw being sharpened. Arranged in these guides are file carrying arms 19 and 20, respectively, and these are connected at their rear ends to a rocker arm 21, that is centrally pivoted on a vertical stud 22 carried by the frame. The rocker arm is provided with a rearwardly extending arm 23 carrying a pin or anti-friction roller 24 that enters a cam groove formed in a collar 26 that is rigidly secured to the shaft 12, and as said shaft is rotated, the rocker bar is oscillated and the file carrying arms 19 and 20 are operated, simultaneously, but in opposite directions, respectively. The outer end of each file carrying arm is arranged for the support of an ordinary form of file $x$, the point of the file being inserted in a suitable socket 27, while the tang is engaged by an adjustable screw 28 that is carried by a lug 29 at the end of the arm.

At a point near the front of the frame is a cam shaft 30 carrying a cam 31 that extends under both of the file carrying arms. At one end of the shaft is secured a rocker arm 32 that is connected by a rod 33 to a crank 34 at the end of the shaft 12. The cam is so arranged on shaft 30 that during the idle strokes of the file, the file carrying arms will be elevated, one arm being elevated while making the stroke in one direction, and the other being elevated while making the stroke in the opposite direction, and during the active stroke the file carrying arms are allowed to descend, and in addition are forced downward so that the files may properly engage the saw, leaf springs 36 being employed for this purpose. The leaf springs 36 are carried by a transversely disposed rock shaft 37 that is mounted in suitable brackets 38 supported by the frame, and at one end of said rock shaft 37 is a rocker arm 40 that is connected by a link 41 to a rocker arm 42 at the end of the crank shaft 30. These parts are so arranged that during the active stroke, the springs are forced down into engagement with the upper surface of the file carriers, but during the idle stroke the rock shaft 37 is turned in order to relieve pressure on the file carrying arms as the latter are elevated. In order to adjust the stress of the springs, the rocker arm 40 is connected to the rock shaft 37 by means of a thumb screw 48, and by loosening the screw and turning the shaft, the stress of the spring may be increased to any desired extent. The screw may then be turned in order to lock the shaft in adjusted position.

At the front of the frame is arranged a pair of guide strips 50 and 51 that are provided with oppositely disposed grooves for the reception of a slidable bar 52 that carries a number of vertically disposed arms 53, and at the upper ends of these arms are saw clamping strips 54 which are preferably secured together at their opposite ends at points beyond the ends of the saw. The central portion of the clamp may then be forced tightly against the saw by means of a screw 58 passing through one of the arms 53. The clamp is of such construction as to accommodate any of the commerical forms of hand or meat saws, although, of course, it may be modified for the purpose of filing saws of any type.

To the inner face of the bar 50 are secured brackets 60 that serve as supports for a revolubly adjustable rack 61. This rack is in the form of a many sided bar that is provided with sets of rack teeth 62 of different pitch, any one of which may be adjusted to operative position in accordance with the pitch of the teeth of the saw being sharpened.

The teeth of the rack in operative position are engaged by a spring pressed pawl 65 that is carried at one end of a lever 66 pivoted on a stud 67 that is carried by a portion of the frame. The opposite end of the lever is engaged by a cam 68 on a disk 69 that is supported by the shaft 11, and said lever is held in engagement, or in operative relation to the cam by means of a small spring 70.

The feeding movement of the pawl carrying lever is limited by an adjustable stop block 71 that is supported by the frame and is provided with a locking screw 72 that is arranged to extend through a suitable slot in the frame for the purpose of permitting ready adjustment of the block, and the position of said block may be determined by gage marks 73 that are formed in the frame.

It will be seen that while the cam 68 moves the lever 66 outward to the same position at each operation, the extent of inward movement of the lever is controlled by the stop block 71, and the stroke of the lever may thus be adjusted in accordance with the pitch of the rack with which the feeding pawl is in engagement, so that the operator, knowing the pitch of the saw teeth, may readily adjust the rack of corresponding pitch to operative position and then adjust the gage block 71 to a corresponding extent.

The setting of the saw teeth is accomplished by a pair of dies 80 and 81 that are arranged to engage adjacent the teeth and set the same in opposite directions, respectively. These setting dies are supported by blocks 82 that are adjustable in slots 83 formed in a pair of levers 84—85. The adjustment of the carrying blocks is, of course, determined by the pitch of the saw teeth, and when once adjusted the blocks may be positively locked by nuts 86.

Extending from one of the side members of the frame is a bracket 88 that carries a vertically disposed stud 89 on which is pivoted a lever 90, and said lever is provided with two alining slots 91 for the reception of pins or anti-friction rollers 92 that are carried by the levers 84—85. This bar is connected at one end to a rod 94 that is carried by an eccentric strap 95 embracing an eccentric 96. The eccentric is arranged at the upper end of a shaft 97 that is vertically stepped in the frame, and said shaft 97 carries a rocker arm 98 that is connected to one end of a slidably mounted bar 99 that is held at one end of a suitable guide block 100 supported by the frame. The bar 99 is provided with a pair of spaced depending fingers 101 which are engaged by a crank pin 102 that projects from the disk 69, and as the disk rotates, the bar 99 will be moved in the direction of its length, and this movement will be transmitted through the mechanism described to the lever 90, causing the latter to turn on its pivot 89 and the walls of the slots 91 then acting as cams on the pins or anti-friction rollers 92, and causing the levers 84 and 85 to move toward or from each other. The levers are pivotally connected by a vertical stud 103 that is carried by the frame at a point immediately above the saw clamps, so that the dies will be held in position for proper movement, and as said dies simultaneously operate in opposite directions, respectively, the stress on the saw and on the operating mechanism will be equalized.

With a device constructed in accordance with this invention, saws may be rapidly set and sharpened without the exercise of any special skill on the part of the workman, and the machine may be readily adjusted in order to accommodate saws of different size and having teeth of different pitch.

I claim:—

1. In a machine of the class described, a frame, a saw support, a pair of reciprocatory file carriers arranged at an angle to each other, a rocker bar to which said carriers are connected, a driven shaft, a cam carried thereby, and connected to the rocker bar to simultaneously impart movement to the carriers in opposite directions, respectively, a cam shaft, an elongated cam carried thereby and extending under both of the file carriers, a rocker arm on said cam shaft, and means for connecting said rocker arm to the driven shaft to time the movement of the cam with relation to the movement of the file carriers.

2. In a machine of the class described, the combination with a saw support, of a pair of file carriers, means for reciprocating said file carriers, means for elevating the file carriers to hold the files from engagement with the saw during the idle or return stroke, pressure springs acting on such carriers, means for supporting said pressure springs, and means for moving the spring supports to relieve the pressure on the file carriers during such idle stroke.

3. In a machine of the class described, the combination with a saw support, of a pair of file carriers, means for reciprocating the same, a cam shaft, cams carried by the shaft and arranged to move the carriers to elevated position during the idle stroke, a rock shaft, springs carried thereby and bearing on the file carrier, and means for turning said shaft to relieve the spring pressure during the idle stroke.

4. In mechanism of the class described, the combination with a saw support, of a pair of reciprocatory file carriers, a rocker bar to which one end of each carrier is connected, means for actuating said rocker bar, a cam shaft, a cam carried by the shaft and arranged to elevate said file carriers, a rock shaft, springs carried by the rock shaft and bearing on the carrier, a rocker arm extending from the rock shaft, a second rocker arm carried by the cam shaft, a link connecting the two rocker arms, and means for imparting movement to the cam shaft.

In testimony that I claim the foregoing as my own, I have hereto affixed my signature in the presence of two witnesses.

LOGAN S. KEETER.

Witnesses:
D. Z. WHITE,
C. J. KESTLER.